(12) United States Patent
Mishra et al.

(10) Patent No.: US 10,123,095 B2
(45) Date of Patent: Nov. 6, 2018

(54) DYNAMIC SUMMARIES FOR MEDIA CONTENT

(71) Applicant: Amazon Technologies, Inc., Seattle, WA (US)

(72) Inventors: Pragyana K. Mishra, Seattle, WA (US); Dushyant Goyal, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/618,447

(22) Filed: Jun. 9, 2017

(65) Prior Publication Data

US 2017/0280208 A1   Sep. 28, 2017

Related U.S. Application Data

(63) Continuation of application No. 15/079,801, filed on Mar. 24, 2016, now Pat. No. 9,826,285.

(51) Int. Cl.
*H04N 21/8549* (2011.01)
*G06K 9/00* (2006.01)
*H04N 21/258* (2011.01)
*H04N 21/45* (2011.01)
*H04N 21/84* (2011.01)
(Continued)

(52) U.S. Cl.
CPC ..... *H04N 21/8549* (2013.01); *G06K 9/00718* (2013.01); *G06K 9/00751* (2013.01); *G06K 9/00765* (2013.01); *G06K 9/6278* (2013.01); *G06K 9/6296* (2013.01); *H04N 21/25883* (2013.01); *H04N 21/25891* (2013.01); *H04N 21/44222* (2013.01); *H04N 21/4532* (2013.01);
(Continued)

(58) Field of Classification Search
CPC ............. H04N 21/8549; H04N 21/482; H04N 21/25883; H04N 21/25891; H04N 21/4532; H04N 21/8166; H04N 21/84; G06K 9/00718; G06K 9/00751; G06K 9/00765; G06K 9/66
See application file for complete search history.

(56) References Cited

U.S. PATENT DOCUMENTS 6,370,543 B2   4/2002   Hoffert et al.
7,111,315 B1   9/2006   Tsurumoto
(Continued)

OTHER PUBLICATIONS

"Record and Search TV Coverage in a Snap!—SnapStream Enterprise" (http://www.snapstream.com/enterprise/default.asp) on Sep. 21, 2011 as retrieved by Internet Archive (https://archive.org/index.php).

(Continued)

*Primary Examiner* — Hunter B Lonsberry
(74) *Attorney, Agent, or Firm* — Thomas | Horstemeyer, LLP

(57) ABSTRACT

Disclosed are various embodiments for providing dynamically generated summaries of media content, such as electronic books, audiobooks, audio series, video content series, and so on. An elapsed time since consumption of media content was ended is determined. A summary of a portion of the media content occurring prior to a point of resumption in the media content is dynamically generated. The content of the summary is selected according to a length of the elapsed time. The summary is presented via an output device.

20 Claims, 6 Drawing Sheets

(51) Int. Cl.
  *G06K 9/62* (2006.01)
  *H04N 21/442* (2011.01)
  *H04N 21/658* (2011.01)
(52) U.S. Cl.
  CPC ......... *H04N 21/6582* (2013.01); *H04N 21/84* (2013.01)

(56) References Cited

U.S. PATENT DOCUMENTS

| | | |
|---|---|---|
| 7,680,853 B2 | 3/2010 | Yu et al. |
| 8,214,374 B1 | 7/2012 | Acharya |
| 2003/0229813 A1* | 12/2003 | Shiiyama .............. G06F 1/3203 713/300 |
| 2007/0124777 A1 | 5/2007 | Bennett et al. |
| 2007/0174774 A1 | 7/2007 | Lerman et al. |
| 2007/0266002 A1 | 11/2007 | Chowdhury et al. |
| 2009/0022473 A1 | 1/2009 | Cope et al. |
| 2009/0112714 A1 | 4/2009 | Steelberg et al. |
| 2009/0234735 A1 | 9/2009 | Maurer |
| 2011/0035219 A1 | 2/2011 | Kadirkamanathan et al. |
| 2011/0078724 A1 | 3/2011 | Mehta et al. |
| 2012/0066243 A1 | 3/2012 | Jammalamadaka |
| 2012/0095958 A1 | 4/2012 | Pereira et al. |
| 2012/0148215 A1 | 6/2012 | Kennedy |
| 2012/0219265 A1 | 8/2012 | Sriganesh et al. |
| 2012/0284094 A1* | 11/2012 | de Leon ............ G06F 17/30843 705/14.4 |
| 2013/0227401 A1* | 8/2013 | Kandekar ......... G06F 17/30719 715/254 |
| 2014/0157306 A1 | 6/2014 | Deo et al. |
| 2014/0351836 A1 | 11/2014 | Hayashida |
| 2015/0334472 A1 | 11/2015 | Kishore |

OTHER PUBLICATIONS

Wei, Eugene. "Search Captions on Hulu" (http://blog.hulu.com/2009/12/21/search-captions-on-hulu/) published on Dec. 21, 2009 and retrieved by Internet Archive on Jul. 4, 2011 (https://archive.org/index.php).

Hulu—Support, http://web.archive.org/web/20101108081607/http://www.hulu.eom/support/article/166529, dated Jun. 29, 2010.

Movie Quotes—Subzin.com, http://web.archive.org/web/20110716162224/http://www.subzin.com/, archived Jul. 22, 2011.

* cited by examiner

DYNAMIC SUMMARIES FOR MEDIA CONTENT

CROSS-REFERENCE TO RELATED APPLICATIONS

This application is a continuation of, and claims priority to, co-pending U.S. Patent Application entitled "DYNAMIC SUMMARIES FOR MEDIA CONTENT," filed on Mar. 24, 2016, and assigned application Ser. No. 15/079,801, which is incorporated herein by reference in its entirety.

BACKGROUND

Television dramas often have story arcs that span multiple episodes and seasons. Due to time passing between episodes and between seasons, viewers may forget important details from the previous episodes or seasons. These details may be important in understanding the current episode. For example, it may be important to know how two characters met in a previous episode in order to understand how the two characters are relating to one another in a current episode. For these reasons, producers may create "recap" segments at the beginning of an episode to summarize relevant events in previous episodes or seasons.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
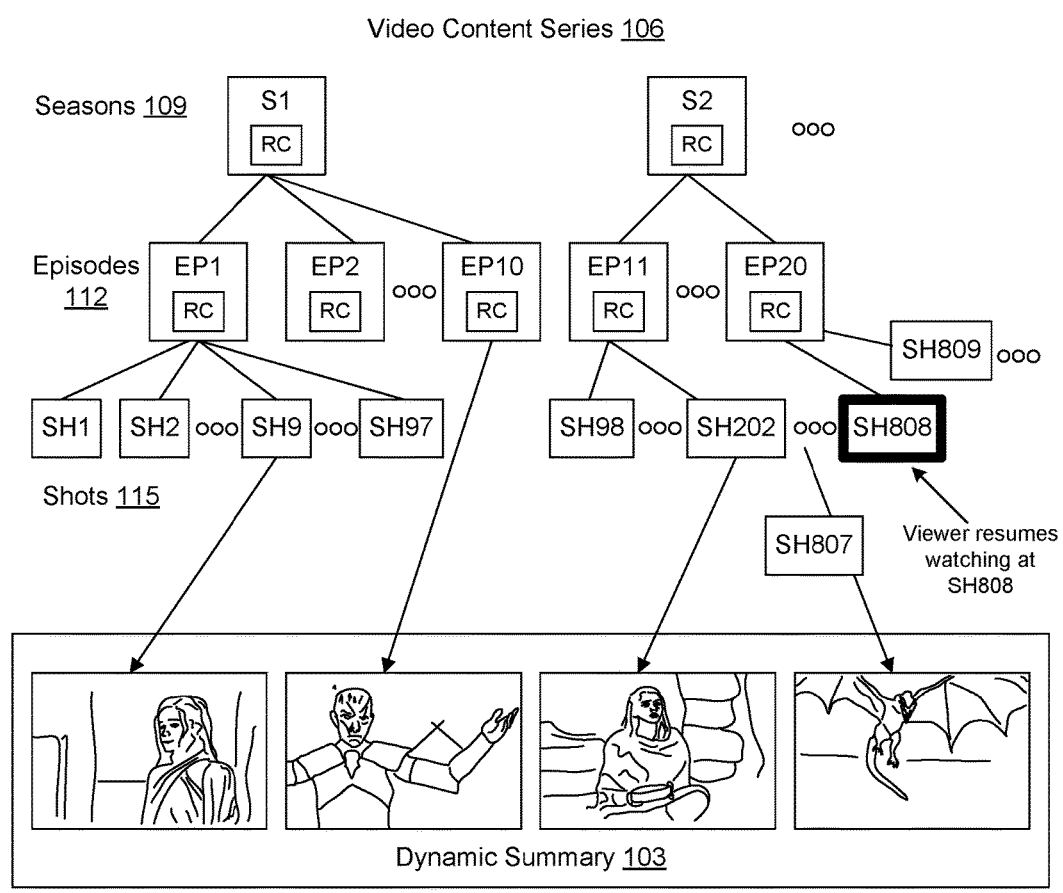
FIGS. 1A and 1B are drawings of example scenarios involving dynamic summary generation for media content according to various embodiments of the present disclosure.

The present disclosure relates to dynamically generated summaries for media content, such as electronic books, audiobooks, audio content series (e.g., podcasts), video content series (e.g., television serials, movies), and so on. The advent of video streaming services has enabled a new phenomenon of "binge watching" video content series. Instead of watching an episode of a video content series each week as it originally airs, viewers are now watching as much as they can in one sitting. Viewers may spend hours watching episodes of a series, and then stop once they get tired. When they stop, they may stop mid-season, or even mid-episode. Often they will not return to continue watching the series for days, weeks, or even longer.

However, when viewers return to continue watching the series, they have forgotten events of significance in the preceding episodes, characters and relationships between characters, or elements of the plot or storylines. The continuity in the viewing experience is interrupted. With many series, episodes are not often self-contained and may include story arcs that span multiple episodes or even multiple seasons. A series may include a recap at the beginning of the episode, but such a recap is not helpful if the viewer resumes watching the series in the middle of an episode. Further, such a manually created recap assumes a standard viewing pattern and is not personalized for a given viewer. For example, the recap does not extend further back in time than the past few episodes or previous season.

Various embodiments of the present disclosure introduce dynamically generated summaries or recaps of media content. The summary is tailored to the consumption history of a given user. With respect to a viewer in a "binge viewing" scenario, the summary may be dynamically generated relative to where the viewer stopped viewing. Consequently, even if a viewer resumes watching a video content series mid-episode, a summary may be provided of scenes of significance occurring in the portion of the episode that has already been viewed. Moreover, different viewers may have different memory capabilities, pay different levels of attention when watching, have multiple interruptions at different instances, or stop watching the content for different intervals of time. The length and detail of the summary may thus be personalized for such characteristics of a given viewer. In addition, the content included in a summary may be customized for relevance to the portion of the media content that is about to be consumed (e.g., the remainder of the episode to which a viewer returns to watch).

Embodiments of the present disclosure can provide summaries of different types of media content beyond video content series, such as electronic books, audio books, podcasts, movies, audio-visual narratives, and other forms of media content. For instance, a reader may read the first nine chapters and a portion of a tenth chapter in an electronic book, and then return to the book a month later. In this case, a summary may be dynamically generated covering a synopsis of the storyline in the first nine chapters, and significant quotations lifted from the portion of the tenth chapter that has been read. Also, in various embodiments, the media content may include real-time streaming media content, such as live coverage of a sporting event.

Although many examples discussed herein pertain to summaries of content that has been consumed previously, other examples involve dynamically generating summaries of content that has not yet been consumed. Suppose that a viewer of an episode of a television series has to stop playback of the episode ten minutes early in order to attend a meeting. In various embodiments, the viewer can then be shown a brief summary of scenes of significance occurring in the last ten minutes of the episode, with similar principles being used to generate the summary dynamically.

Turning now to FIG. 1A, shown is a drawing of an example scenario 100 of generation of a dynamic summary 103 according to various embodiments. The example scenario 100 pertains to a video content series 106, which is structured into a hierarchy of logical divisions that includes seasons 109 at the top level, episodes 112 at the middle level, and shots 115 at the base level. In this example, there are at least two seasons 109, S1 and S2. Each of the seasons 109 can be associated with a respective season-level recap RC that may be predefined and provided by a content producer or may be dynamically generated.

Each of the seasons 109 contains a number of episodes 112. For example, S1 may be divided into ten episodes 112, EP1 through EP10. Likewise, S2 may be divided into ten episodes 112, EP11 through EP20. Each of the episodes 112 may be associated with a respective episode-level recap RC that may be predefined and provided by a content producer or may be dynamically generated. Each episode 112 may be divided into a number of shots 115 or scenes. For example, EP1 is divided into 97 scenes, SH1 through SH97, EP11 is divided into SH98 through SH202, and EP20 is divided into SH807, SH808, SH809, and so forth.

Assume that a user previously stopped watching the video content series 106 at the shot 115 that is labeled SH808. According to the principles of the present disclosure, a dynamic summary 103 is generated for the portion of the video content series 106 that occurs prior to the point of resumption. In this example, the dynamic summary 103 contains shot SH9 from episode EP1, the recap of episode EP10, shot SH202 from episode EP 11, and a shot SH807 that precedes shot SH808. The length of the dynamic summary 103 can be determined according to, among other factors, the length of time since the user last watched the video content series 106. Further, the content of shot SH808 and subsequent shots 115 may be analyzed to determine characters, plot, and storyline elements, and the components of the dynamic summary 103 may be selected based at least in part on relevance to the content of shot SH808 and subsequent shots.

For example, suppose that shot SH808 and subsequent shots SH809 and so forth in episode EP20 discuss a battle between a character named "Danielle" and dragons. Shot SH9 may be selected as the first appearance of Danielle in the video content series 106. The recap of episode EP10 may be pertinent in that it explains why the dragons have arrived in the geographic region. Shot SH202 may show the dragons impacting the villagers. Finally, leading up to the point of resumption in the video content series 106, shot SH807 may show the beginning of the battle continued in shot SH808. In this way, the dynamic summary 103 brings the viewer up to date in a personalized manner with respect to the video content series 106 that is being resumed.

Figure 1B:
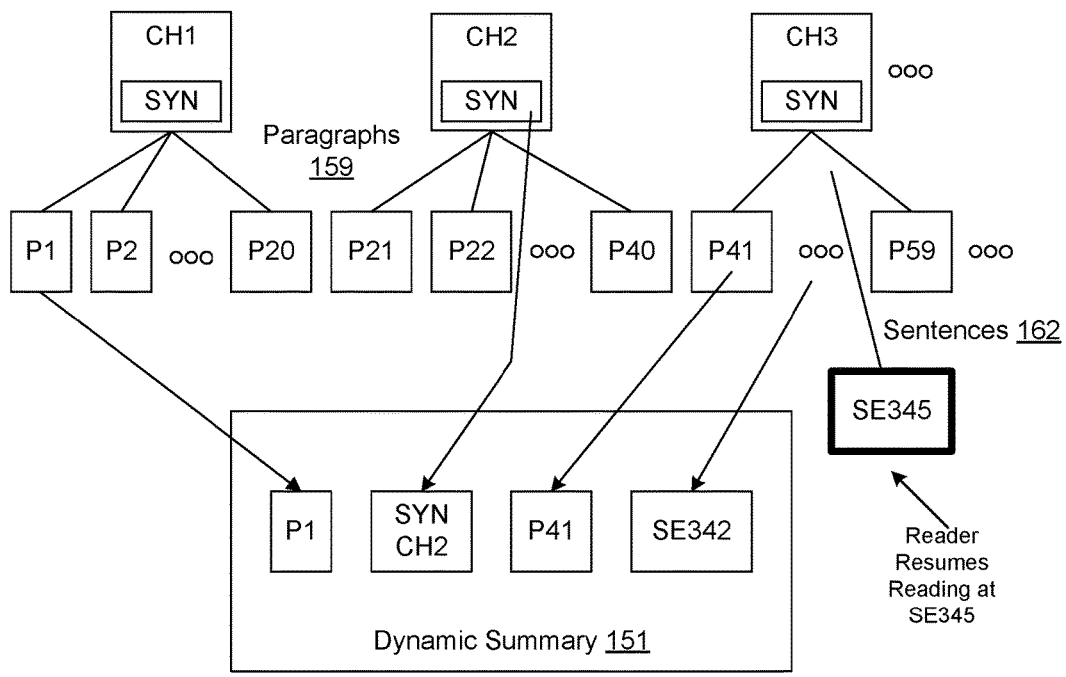

Moving on to FIG. 1B, shown is a drawing of an example scenario 150 of generation of a dynamic summary 151 according to various embodiments. In the example scenario 150, an electronic book 153 is composed of a plurality of chapters 156. Each of the chapters 156 may in turn be composed of a plurality of paragraphs 159, which may themselves be formed of one or more sentences 162. Suppose that the electronic book 153 includes chapters CH1, CH2, CH3, and so on, and that each respective chapter 156 may be associated with a corresponding synopsis SYN. Chapter CH1 may be associated with paragraphs P1, P2 . . . P20, chapter CH2 may be associated with paragraphs P21, P22 . . . P40, chapter CH3 may be associated with paragraphs P41 through P59, and so forth.

Suppose that a reader resumes reading at sentence SE345 in chapter CH3. A dynamic summary 151 may be generated for that reader from the portion of the electronic book 153 prior to sentence SE345 based upon relevance to the content the reader is about to read, general significance in the portion to be summarized, as well as other personalizing factors, such as the length of time since the reader left off in reading. In this non-limiting example, the dynamic summary 151 includes paragraph P1 from chapter CH1, a synopsis of chapter CH2, paragraph P41 from chapter CH3, and sentence SE342 from another paragraph 159 in chapter CH3. In the following discussion, a general description of the system and its components is provided, followed by a discussion of the operation of the same.

Figure 2:
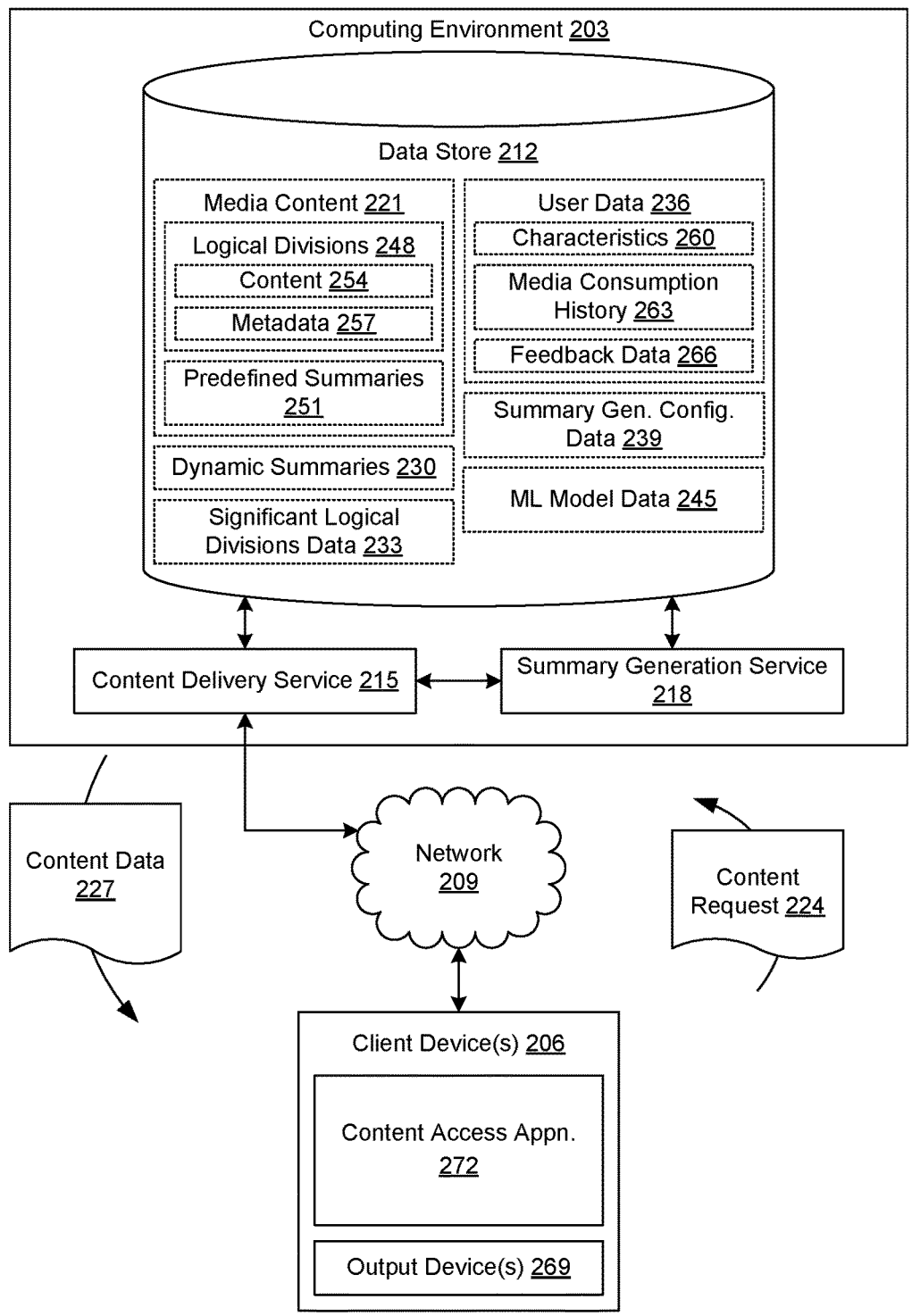
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery service 215, a summary generation service 218, and other applications, services, processes, systems, engines, or functionality not discussed in detail herein. The content delivery service 215 is configured to deliver media content 221 over the network 209 for user consumption via the client devices 206. The content delivery service 215 receives content requests 224 from client devices 206 and sends content data 227 to the client devices 206. In this regard, the content delivery service 215 may facilitate streaming of large content files or real-time live content via the network 209 to the client devices 206. Where the media content 221 corresponds to electronic books or audio segments or other content of a sufficiently small size, the content delivery service 215 may deliver the entirety of the media content 221 to the client device 206 to be stored on the client device 206 and presented to a user. The content delivery service 215 may also perform rights management functionality with respect to the media content 221.

The summary generation service 218 is executed to dynamically generate summaries of the media content 221 that are personalized for a user. Based at least in part on various inputs, including user characteristics and preferences, where the user left off in the media content 221, metadata indicating portions of significance, and so on, the summary generation service 218 dynamically generates a summary that features important elements of the media content 221, and where applicable, is relevant to the portion of the media content 221 that the user is about to consume.

The data stored in the data store 212 includes, for example, media content 221, dynamic summaries 230, significant logical divisions data 233, user data 236, summary generation configuration data 239, machine learning model data 242, and potentially other data. The media content 221 comprises media items that may be consumed by users. For example, the media content 221 may include video programs, video content series, movies, live streaming content, audiobooks, audio programs, podcasts and audio content series, electronic books and other electronic publications, or other items. The media content 221 may be pre-produced or live in real-time, potentially with a delay or buffer. The media content 221 may include logical divisions 248 and predefined summaries 251.

The logical divisions 248 correspond to any recognized approach to dividing the media content 221. In the case of a video content series, the media content 221 may be divided into seasons, episodes, shots or scenes, and frames. In the case of an electronic book, the media content 221 may be divided into volumes, chapters, sections, paragraphs, and sentences. In the case of an audio content series, the media content 221 may be divided into episodes and segments. In many cases, the media content 221 will be divided into a hierarchy of logical divisions 248, where a first level division is comprised of one or more second level divisions. For example, a chapter is comprised of multiple paragraphs, where each paragraph in turn is comprised of multiple sentences.

The media content 221 may be predivided into the logical divisions 248, or an application in the computing environment 203 may perform this processing. In some cases, the media content 221 may be manually divided into the logical divisions 248. In other cases, the media content 221 may be automatically divided into the logical divisions 248 using a rule base pertinent to the particular format of the media content 221. For example, scenes may be extracted from a movie based upon lighting and color differences between video frames, while chapters may be extracted from an electronic book based upon heading formatting. Various rules with thresholds and criteria can be established to divide the media content 221 as desired. In some cases, the media content 221 may already be split up into multiple files, where each file corresponds to an underlying logical division 248.

Each logical division 248 may be associated with content 254 and metadata 257. The content 254 may comprise text, audio, video, graphics, etc. The metadata 257 may describe the content 254 and the logical division 248. For example, the metadata 257 may encode characters present in the content 254, plot elements, storyline elements, locations, visual characteristics (e.g., colors, lighting), audio characteristics (e.g., tone of speech, emotions, music), popularity ratings, relative significance, and so on. The metadata 257 may be manually populated and/or automatically generated based at least in part on an analysis. For example, face detection and recognition techniques may be used to automatically determine characters in a scene, while voice recognition techniques may be used to automatically determine a speaker in segment of an audio content series.

The predefined summaries 251 may provide a hierarchy of existing summaries for the media content 221. For instance, a video content series may include season-level recaps and episode-level recaps created by the content producer. Predefined summaries 251 may be leveraged to aid creation of a dynamic summary 230. In some cases, predefined summaries 251 may be automatically created and stored for later use within dynamic summaries 230.

The dynamic summaries 230 are generated by the summary generation service 218 to provide a personalized summary of a portion of media content 221 before or after a particular position in the media content 221. The dynamic summaries 230 are tailored to the particular position in the media content 221, which may be at a point within a logical division 248 that is not associated with a predefined summary 251, such as midway through an episode of a video content series. Moreover, the dynamic summaries 230 may be dynamically generated to be highly relevant to the portion of the media content 254 to be consumed (e.g., read, listened to, or viewed). For example, the dynamic summaries 230 may provide background on two characters who appear together in the portion of the media content 254 to be consumed. The length and content of the dynamic summaries 230 may depend upon user characteristics. For example, male users may prefer to watch action sequences, while female users may prefer to watch romantic sequences. Also, the dynamic summaries 230 may include more detail for users who are less likely to remember details (e.g., if a relatively long time has elapsed since consuming the portion of the media content 221 that is being summarized). In some cases, the dynamic summaries 230 may be rated by users, and a user may be able to choose to consume a dynamic summary 230 meeting a threshold for popularity.

The significant logical divisions data 233 may describe a subset of the logical divisions 248 for the media content 221 that are considered relatively significant or salient. In one embodiment, each logical division 248 at a base level (e.g., sentences, scenes) may be associated with a significance rating. Such ratings may be assigned automatically via a machine learning approach and feedback from users. Alternatively, the ratings may be crowdsourced. Crowdsourcing may occur directly or indirectly. For example, popularity of dialogue in a scene may be determined through frequency of text searches that match the dialogue. Various embodiments that pertain to automatic creation of custom abridgements of content based on textual search queries are described in U.S. patent application Ser. No. 13/647,931, entitled "ANALYZING USER SEARCHES OF VERBAL MEDIA CONTENT," filed on Oct. 9, 2012, which issued as U.S. Pat. No. 9,165,072 on Oct. 20, 2015, which is incorporated herein by reference in its entirety. Other approaches to crowdsourcing the identification of significant portions of media content 221 are described in U.S. patent application Ser. No. 13/404,459, entitled "ANALYZING USER BEHAVIOR RELATIVE TO MEDIA CONTENT," filed on Feb. 24, 2012, which is incorporated herein by reference in its entirety.

The user data 236 may include a variety of data regarding users that may be leveraged by the summary generation service 218 in personalizing the dynamic summaries 230. To this end, the user data 236 may include characteristics 260, a media consumption history 263, feedback data 266, and/or other data. The characteristics 260 may include any characteristic of the user that may have a bearing on what type of dynamic summary 230 would be viewed as most helpful or relevant to the particular user. For example, the characteristics 260 may include age, gender, location, summary length preferences, etc.

The media consumption history 263 tracks the user's consumption habits with respect to the media content 221. This may be used to profile the user's likely level of attention to the media content 221 that he or she has consumed, which may be related to the level of detail and length to be used for generating the dynamic summary 230.

Also, the media consumption history 263 may be used to track an elapsed time since the user left off in consuming particular media content 221, and elapsed times since the user consumed previous logical divisions 248 of media content 221. The feedback data 266 may indicate implicit or explicit feedback from the user regarding dynamic summaries 230 that were presented to the user.

The summary generation configuration data 239 includes thresholds, target lengths, factor weights, and/or other parameters used to control the dynamic generation of the dynamic summaries 230. The parameters in the summary generation configuration data 239 may be manually established and/or set automatically via machine learning approaches. The machine learning model data 245 corresponds to training data and output data for a machine learning model to determine operating parameters for the summary generation service 218. Various machine learning models that may be used may include trees and Bayesian networks. The feedback data 266 indicating whether the user liked or disliked the dynamic summary 230 may be used to control how future dynamic summaries 230 are generated for the particular user and/or other users.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices. The client device 206 may include one or more output devices 269 such as a display and a sound device. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a content access application 272 and/or other applications. The content access application 272 may be executed to send content requests 224 over the network 209 to the content delivery service 215 and to receive content data 227. The content access application 272 may then render the content data 227 for presentation to a user via one or more output devices 269. The content data 227 may include media content 221 and dynamic summaries 230. The client device 206 may be configured to execute applications beyond the content access application 272 such as, for example, browsers, email applications, social networking applications, word processors, spreadsheets, and/or other applications.

Although the dynamic generation of the dynamic summaries 230 has been described primarily with reference to server-side generation, it is understood that the functionality of the summary generation service 218 may be implemented client-side in some embodiments. In such embodiments, some or all of the data in the data store 212 may be stored in the client device 206 or may otherwise be made available to the client device 206 via the network 209 (e.g., by way of a web service).

Figure 3:
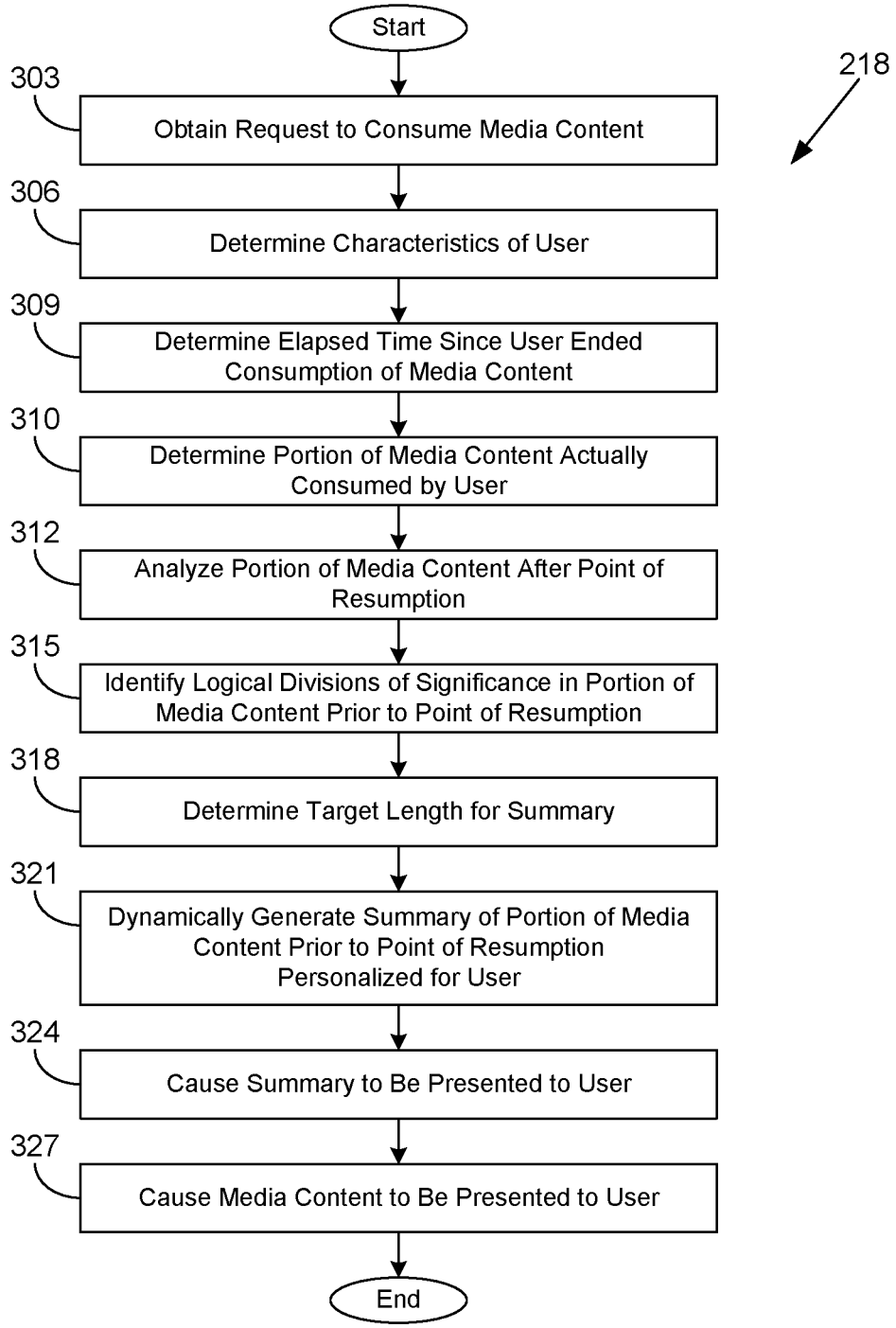
FIGS. 3 and 4 are flowcharts illustrating examples of functionality implemented as portions of a summary generation service executed in a computing environment in the networked environment of FIG. 2 according to various embodiments of the present disclosure.

Referring next to FIG. 3, shown is a flowchart that provides one example of the operation of a portion of the summary generation service 218 according to various embodiments. In particular, FIG. 3 pertains to generating a dynamic summary 230 (FIG. 2) for media content 221 (FIG. 2) that was previously viewed. It is understood that the flowchart of FIG. 3 provides merely an example of the many different types of functional arrangements that may be employed to implement the operation of the portion of the summary generation service 218 as described herein. As an alternative, the flowchart of FIG. 3 may be viewed as depicting an example of elements of a method implemented in the computing environment 203 (FIG. 2) or the client device 206 according to one or more embodiments.

Beginning with box 303, the summary generation service 218 (potentially via the content delivery service 215 (FIG. 2)) obtains a content request 224 (FIG. 2) to consume media content 221. The content request 224 may be based on user input (e.g., a user navigates to a certain episode in a video content series and presses a play button). The content request 224 may specify a starting point or a point of resumption in the media content 221. In box 306, the summary generation service 218 determines the characteristics 260 of the user. For instance, male users may prefer to see action sequences, while female users may prefer to see romantic sequences. Also, users who are likely not to pay close attention to the media content 221 may prefer to see additional detail in a longer dynamic summary 230.

In box 309, the summary generation service 218 may determine the elapsed since the user previously ended consumption of the media content 221, if applicable. This may be determined with reference to the media consumption history 263 (FIG. 2) of the user, which may include time-stamped actions related to media consumption. For example, the summary generation service 218 may determine that it has been sixty-three days since the user last watched a video content series in question, or the summary generation service 218 may determine that it has been 122 days since the user left off in reading an electronic book in question. In addition, the summary generation service 218 may determine how long it has been since the user consumed earlier content 254 (FIG. 2) in a series of media content 221. For example, the summary generation service 218 may determine that it has been a year since the user viewed a first season of a video content series.

In box 310, the summary generation service 218 determines what portion of the media content 221 has actually been consumed by the user. For example, for a season of ten episodes of a video content series, a user may have watched all episodes except for the third and fourth episodes. In generating the dynamic summary 230, the summary generation service 218 may give a greater weight to scenes within the unwatched third and fourth episodes in selecting significant scenes for inclusion in the dynamic summary 230 because the user has not watched those episodes.

In box 312, the summary generation service 218 may analyze a portion of the media content 221 that is after the point of resumption. In this regard, the summary generation service 218 may perform a rule-based analysis on the content 254 or extract parameters from the metadata 257 that indicate cast members, characters, plot elements, storyline elements, locations, etc., that occur in this subsequent portion of the media content 221. This may be used to identify earlier portions of the media content 221 to be included in the dynamic summary 230 as especially relevant to what occurs in the portion of the media content 221 after the point of resumption.

In box 315, the summary generation service 218 identifies logical divisions 248 (FIG. 2) of significance in the portion of the media content 221 prior to the point of resumption. In this regard, the summary generation service 218 may perform a rule-based analysis on the content 254 or metadata 257, or may refer to significant logical divisions data 233.

Rankings may be assigned to each of the logical divisions 248, indicating a relative significance, with significance being defined relative to the entire portion of the media content 221 or being defined relative to what occurs in the portion of the media content 221 subsequent to the point of resumption. Such rankings or indication of significance may be manually curated by editors or may be crowdsourced. In one embodiment, logical divisions 248 of significance may be defined based upon searches for verbal content from the particular logical portions 248 in a search engine.

In box 318, the summary generation service 218 determines a target length for the dynamic summary 230. This target length may depend at least in part on characteristics 260 of the user, the elapsed time since the user left off watching the media content 221, the elapsed time since the user last watched other logical divisions 248 of the media content 221 that are to be summarized, the number of logical divisions 248 of the media content 221 that are considered highly relevant (i.e., meeting a threshold for relevance) with respect to the portion of the media content 221 after the point of resumption, and so on. Depending on the type of media content 221, the target length may be defined in terms of time or in terms of space (i.e., text length).

In box 321, the summary generation service 218 dynamically generates a summary of the portion of the media content 221 prior to the point of resumption, where the dynamic summary 230 is personalized for the user. To this end, the summary generation service 218 may select logical divisions 248 of the media content 221 based upon their relative significance in order to approximate the target length. In this regard, the summary generation service 218 may select all logical divisions 248 with a significance score meeting a threshold from the summary generation configuration data 239. If a predefined summary 251 exists for a logical division 248, and the entirety of the logical division 248 is considered relevant, the summary generation service 218 may insert a predefined summary 251 in the dynamic summary 230. In some cases, logical divisions 248 of the media content 221 may be included in the dynamic summary 230 at an above-normal speed. In various embodiments, a machine learning model may be employed to select logical divisions 248 based upon the content 254 therein, characteristics 260, and other factors, according to the machine learning model data 245 (FIG. 2).

In box 324, the summary generation service 218 causes the dynamic summary 230 to be presented to the user. For example, the content delivery service 215 may stream or transfer the dynamic summary 230 to the client device 206 via the network 209 in the content data 227 (FIG. 2). The content access application 272 (FIG. 2) on the client device 206 may then be configured to render the dynamic summary 230 on one or more output devices 269 (FIG. 2). In various scenarios, the user may request to skip the dynamic summary 230 or provide positive or negative feedback regarding the helpfulness of the summary. This feedback may be recorded by the summary generation service 218 in the feedback data 266. The feedback data 266 may be used to improve the functioning of a machine learning model used in generating the dynamic summary 230.

In box 327, the summary generation service 218 causes the media content 221 to be presented to the user after the dynamic summary 230. For example, the content delivery service 215 may stream or transfer the media content 221 after the point of resumption to the client device 206 via the network 209 in the content data 227. The content access application 272 on the client device 206 may then be configured to render the media content 221 on one or more output devices 269 after presenting the dynamic summary 230. Thereafter, the portion of the summary generation service 218 ends.

Figure 4:
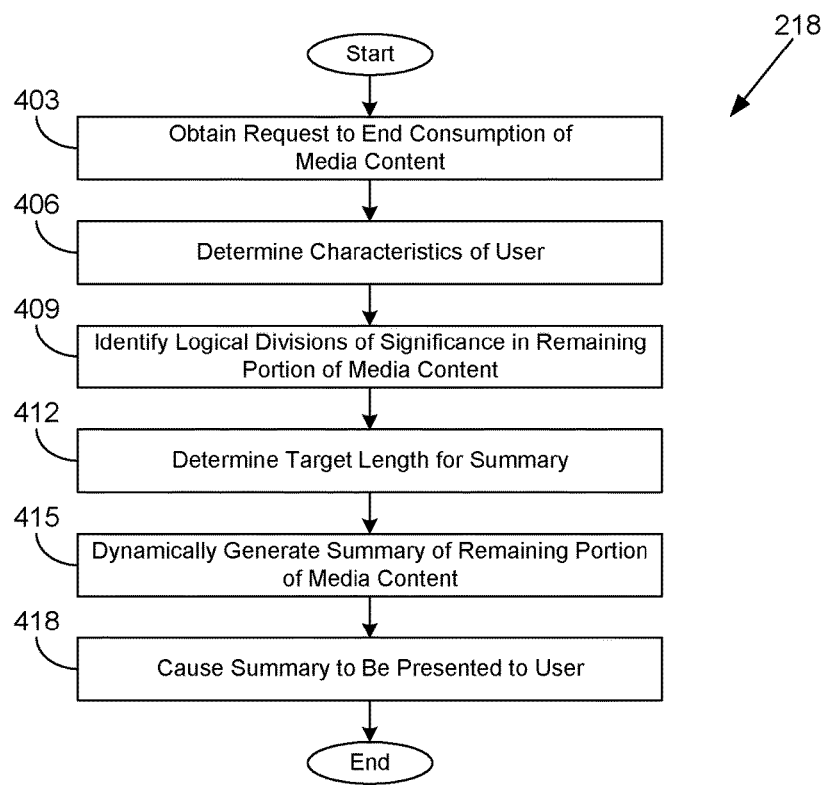

Continuing on to FIG. 4, shown is a flowchart that provides one example of the operation of another portion of the summary generation service 218 according to various embodiments. In particular, FIG. 4 pertains to generating a dynamic summary 230 (FIG. 2) for media content 221 (FIG. 2) that has not been viewed. It is understood that the flowchart of FIG. 4 provides merely an example of the many different types of functional arrangements that may be employed to implement the operation of the portion of the summary generation service 218 as described herein. As an alternative, the flowchart of FIG. 4 may be viewed as depicting an example of elements of a method implemented in the computing environment 203 (FIG. 2) or the client device 206 according to one or more embodiments.

Beginning with box 403, the summary generation service 218 obtains a request to end consumption of media content 221 (FIG. 2). In box 406, the summary generation service 218 determines the characteristics 260 of the user. For instance, male users may prefer to see action sequences, while female users may prefer to see romantic sequences. Also, users who are likely not to pay close attention to the media content 221 may prefer to see additional detail in a longer dynamic summary 230.

In box 409, the summary generation service 218 identifies logical divisions 248 of significance in the remaining portion of the media content 221 occurring after the point at which the user ended consumption. For example, the summary generation service 218 may refer to the significant logical divisions data 233 to determine relative rankings of the remaining logical divisions 248 in the media content 221 with respect to significance. The remaining portion may correspond to a remainder of a particular logical division 248. For instance, the user may wish to see a summary of the remaining episode or chapter, or the user may wish to see a summary of the rest of the season or volume. Such a preference may be explicitly elicited from the user via a user interface or may be inferred from past user behavior via the machine learning model data 245 (FIG. 2).

In box 412, the summary generation service 218 determines a target length for the dynamic summary 230. The summary generation service 218 may prompt the user to select a particular length via a user interface. For example, the user may select from lengths varying from thirty seconds to ten minutes in order to summarize a remaining forty minutes of media content 221.

In box 415, the summary generation service 218 dynamically generates a summary of the remaining portion of the media content 221. To this end, the summary generation service 218 may select logical divisions 248 of the media content 221 based upon their relative significance in order to approximate the target length. In this regard, the summary generation service 218 may select all logical divisions 248 with a significance score meeting a threshold from the summary generation configuration data 239. If a predefined summary 251 exists for a logical division 248, and the entirety of the logical division 248 is considered relevant, the summary generation service 218 may insert a predefined summary 251 in the dynamic summary 230. In some cases, logical divisions 248 of the media content 221 may be included in the dynamic summary 230 at an above-normal speed. In various embodiments, a machine learning model may be employed to select logical divisions 248 based upon the content 254 therein, characteristics 260, and other factors, according to the machine learning model data 245.

In box 418, the summary generation service 218 causes the dynamic summary to be presented to the user. For example, the content delivery service 215 may stream or transfer the dynamic summary 230 to the client device 206 via the network 209 in the content data 227 (FIG. 2). The content access application 272 (FIG. 2) on the client device 206 may then be configured to render the dynamic summary 230 on one or more output devices 269 (FIG. 2). In various scenarios, the user may provide positive or negative feedback regarding the helpfulness of the summary. This feedback may be recorded by the summary generation service 218 in the feedback data 266. The feedback data 266 may be used to improve the functioning of a machine learning model used in generating the dynamic summary 230. Thereafter, the portion of the summary generation service 218 ends.

Figure 5:
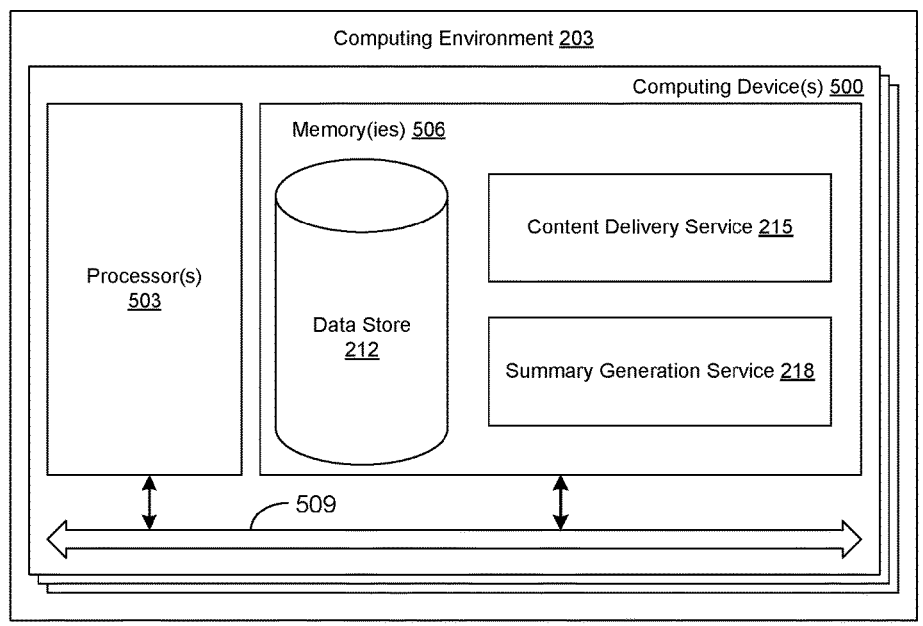
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the content delivery service 215, the summary generation service 218, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the content delivery service 215, the summary generation service 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the summary generation service 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215 and the summary generation service 218, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 215 and the summary generation service 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   at least one application executable in the at least one computing device, wherein when executed the at least one application causes the at least one computing device to at least:
      determine an elapsed time since consumption of media content was ended;
      dynamically generate a summary of a portion of the media content occurring prior to a point of resumption in the media content, wherein content of the summary is selected according to a length of the elapsed time and based at least in part on a popularity of dialogue searches relative to individual logical divisions of the portion of the media content; and
      cause the summary to be presented via an output device.

2. The system of claim 1, wherein when executed the at least one application further causes the at least one computing device to at least cause the media content to be presented via the output device at the point of resumption after presentation of the summary.

3. The system of claim 1, wherein when executed the at least one application further causes the at least one computing device to at least:
   determining a consumption history for the media content; and
   wherein the content of the summary is selected based at least in part on the consumption history.

4. The system of claim 1, wherein when executed the at least one application further causes the at least one computing device to at least:
   analyze another portion of the media content after the point of resumption to determine at least one of: one or more cast members, one or more characters, one or more plot elements, one or more storyline elements, or one or more locations that occur in the other portion of the media content; and
   wherein the content of the summary is selected based at least in part on at least one of: the one or more cast members, the one or more characters, the one or more plot elements, the one or more storyline elements, or the one or more locations that occur in the other portion of the media content.

5. The system of claim 1, wherein when executed the at least one application further causes the at least one computing device to at least:
   receive user feedback regarding the summary; and
   modify a machine learning model used in dynamically generating the summary based at least in part on the user feedback.

6. The system of claim 1, wherein the content of the summary is further selected according to a target summary length that is based at least in part on the elapsed time.

7. The system of claim 1, wherein the media content is real-time media content.

8. The system of claim 1, wherein the media content is an electronic book.

9. The system of claim 1, wherein the summary is dynamically generated based at least in part on metadata indicating which logical divisions of the portion of the media content are associated with a relative significance meeting a threshold.

10. A method, comprising:
    determining, by at least one computing device, a current position in media content being presented via an output device;
    dynamically generating, by the at least one computing device, a summary of a portion of the media content beginning after the current position;
    selecting, by the at least one computing device, content of the summary based at least in part on a popularity of dialogue searches relative to individual logical divisions of the portion of the media content; and
    causing, by the at least one computing device, the summary of the portion of the media content to be presented via the output device.

11. The method of claim 10, further comprising:
    receiving, by the at least one computing device, a target length for the summary via a user interface; and
    wherein the summary is dynamically generated to approximate the target length.

12. The method of claim 10, further comprising:
    receiving, by the at least one computing device, a request to end consumption of the media content; and
    wherein the current position in the media content is determined in response to the request.

13. The method of claim 10, further comprising identifying, by the at least one computing device, logical divisions of significance in the portion of the media content.

14. The method of claim 13, wherein identifying the logical divisions of significance further comprises employing, by the at least one computing device, a machine learning model to select one or more logical divisions of the portion of the media content.

15. The method of claim 10, wherein dynamically generating the summary further comprises inserting, by the at least one computing device, one or more predefined summaries of logical divisions of the portion of the media content in the summary.

16. The method of claim 10, further comprising:
    determining, by the at least one computing device, one or more user characteristics; and
    selecting, by the at least one computing device, the content for the summary from the portion of the media content based at least in part on the one or more user characteristics.

17. A non-transitory computer-readable medium embodying a program executable in at least one computing device, wherein when executed the program causes the at least one computing device to at least:
    determine a current position in media content being presented via an output device;
    dynamically generate a summary of a portion of the media content beginning after the current position;
    select content of the summary based at least in part on a popularity of dialogue searches relative to individual logical divisions of the portion of the media content; and
    cause the summary of the portion of the media content to be presented via the output device.

18. The non-transitory computer-readable medium of claim 17, wherein when executed the program further causes the at least one computing device to at least:
    receive a target length for the summary via a user interface; and
    wherein the summary is dynamically generated to approximate the target length.

19. The non-transitory computer-readable medium of claim 17, wherein when executed the program further causes the at least one computing device to at least insert one or more predefined summaries of logical divisions of the portion of the media content in the summary.

20. The non-transitory computer-readable medium of claim 17, wherein when executed the program further causes the at least one computing device to at least:
    determine one or more user characteristics; and
    select the content for the summary from the portion of the media content based at least in part on the one or more user characteristics.

* * * * *